US010248940B1

(12) United States Patent
Bota et al.

(10) Patent No.: US 10,248,940 B1
(45) Date of Patent: Apr. 2, 2019

(54) MODULAR FIRMWARE FOR TRANSACTION SYSTEM

(71) Applicant: Square, Inc., San Francisco, CA (US)

(72) Inventors: Ovidiu I Bota, Georgetown (CA); Kshitiz Vadera, Toronto (CA)

(73) Assignee: Square, Inc., San Francisco, CA (US)

( * ) Notice: Subject to any disclaimer, the term of this patent is extended or adjusted under 35 U.S.C. 154(b) by 551 days.

(21) Appl. No.: 14/863,675

(22) Filed: Sep. 24, 2015

(51) Int. Cl.
G06Q 20/20 (2012.01)
G06Q 20/32 (2012.01)
G06Q 20/34 (2012.01)

(52) U.S. Cl.
CPC ....... *G06Q 20/204* (2013.01); *G06Q 20/3278* (2013.01); *G06Q 20/341* (2013.01); *G06Q 20/352* (2013.01)

(58) Field of Classification Search
USPC .......................................................... 705/17
See application file for complete search history.

(56) References Cited

U.S. PATENT DOCUMENTS

| | | | |
|---|---|---|---|
| 5,696,955 A | 12/1997 | Goddard et al. | |
| 5,793,027 A | 8/1998 | Baik | |
| 5,974,312 A * | 10/1999 | Hayes, Jr. | H04W 8/245 455/419 |
| 6,065,679 A * | 5/2000 | Levie | G06Q 20/343 235/462.47 |
| 6,230,319 B1 | 5/2001 | Britt, Jr. et al. | |
| 6,332,172 B1 | 12/2001 | Iverson | |
| 6,609,655 B1 | 8/2003 | Harrell | |
| 6,675,203 B1 | 1/2004 | Herrod et al. | |
| 7,318,151 B1 * | 1/2008 | Harris | G06F 21/572 713/100 |
| 7,472,394 B1 * | 12/2008 | Meckenstock | G06Q 20/20 719/310 |
| 7,478,065 B1 | 1/2009 | Ritter et al. | |
| 8,180,971 B2 * | 5/2012 | Scott | G06F 12/0842 711/119 |

(Continued)

FOREIGN PATENT DOCUMENTS

| | | |
|---|---|---|
| CA | 2 997 776 A1 | 3/2017 |
| CN | 108140182 A | 6/2018 |

(Continued)

OTHER PUBLICATIONS

Notice of Allowance dated Jan. 7, 2016, for U.S. Appl. No. 14/863,381, of Vadera, K., filed Sep. 23, 2015.

(Continued)

*Primary Examiner* — Ashford S Hayles
(74) *Attorney, Agent, or Firm* — Maynard Cooper & Gale, LLP; Chitra M. Kalyanaraman, Esq.

(57) ABSTRACT

A transaction processing system includes a payment reader for processing payment transactions. The payment reader receives payment information from a payment interface. The payment information is processed based on firmware instructions that are stored in memory and executed by a processor. A first subset of the firmware instructions is associated with transaction processing modules. Each of the transaction processing modules comprise position independent code and are located in a distinct section of memory from a second subset of firmware instructions and the position independent code associated with each of the other of the transaction processing modules.

27 Claims, 8 Drawing Sheets

(56) References Cited

U.S. PATENT DOCUMENTS

| | | | |
|---|---|---|---|
| 8,196,131 B1* | 6/2012 | von Behren | G06Q 20/367 705/64 |
| 8,245,076 B2* | 8/2012 | Schindel, Jr. | G07F 19/206 235/379 |
| 8,284,061 B1 | 10/2012 | Dione | |
| 8,335,921 B2 | 12/2012 | von Behren et al. | |
| 8,336,762 B1 | 12/2012 | DiMattina et al. | |
| 8,534,555 B1 | 9/2013 | Sweet et al. | |
| 8,650,439 B2* | 2/2014 | Rabeler | G06F 11/1004 455/418 |
| 8,910,868 B1* | 12/2014 | Wade | G06K 7/0095 235/449 |
| 8,959,034 B2 | 2/2015 | Jiang et al. | |
| 9,092,766 B1* | 7/2015 | Bedier | G06Q 20/204 |
| 9,134,994 B2* | 9/2015 | Patel | G06F 8/20 |
| 9,330,383 B1 | 5/2016 | Vadera | |
| 9,342,823 B2 | 5/2016 | Casares et al. | |
| 9,357,332 B2 | 5/2016 | Tang et al. | |
| 9,613,350 B1 | 4/2017 | Vadera | |
| 9,672,508 B2* | 6/2017 | Aabye | G06Q 20/10 |
| 9,778,928 B1 | 10/2017 | Steshenko et al. | |
| 9,785,930 B1 | 10/2017 | Terra et al. | |
| 9,916,567 B1* | 3/2018 | Baar | G06Q 20/30 |
| 2003/0132293 A1* | 7/2003 | Fitch | G06F 1/18 235/383 |
| 2004/0068656 A1 | 4/2004 | Lu | |
| 2004/0104268 A1 | 6/2004 | Bailey | |
| 2004/0138868 A1* | 7/2004 | Kuznetsov | G06F 3/0614 703/25 |
| 2004/0205745 A1 | 10/2004 | Piazza | |
| 2004/0230488 A1 | 11/2004 | Beenau et al. | |
| 2004/0236672 A1 | 11/2004 | Jung et al. | |
| 2005/0091589 A1* | 4/2005 | Ramarao | G06F 17/2247 715/248 |
| 2005/0156026 A1* | 7/2005 | Ghosh | G06Q 20/045 235/380 |
| 2005/0240919 A1* | 10/2005 | Kim | G06F 8/65 717/168 |
| 2006/0059530 A1* | 3/2006 | Spielman | H04L 41/082 725/132 |
| 2006/0093149 A1* | 5/2006 | Zhu | H04L 63/0442 380/277 |
| 2006/0219776 A1 | 10/2006 | Finn | |
| 2007/0044099 A1 | 2/2007 | Rajput | |
| 2007/0078957 A1* | 4/2007 | Ypya | G06F 21/10 709/222 |
| 2007/0168265 A1 | 7/2007 | Rosenberger | |
| 2007/0241185 A1* | 10/2007 | Pang | G06F 9/546 235/380 |
| 2007/0257109 A1* | 11/2007 | Johansen, Jr. | G07F 7/08 235/383 |
| 2008/0121687 A1 | 5/2008 | Buhot | |
| 2008/0162312 A1 | 7/2008 | Sklovsky et al. | |
| 2008/0162361 A1 | 7/2008 | Sklovsky et al. | |
| 2008/0179388 A1* | 7/2008 | Pang | G06K 7/10851 235/375 |
| 2008/0203170 A1 | 8/2008 | Hammad et al. | |
| 2008/0222193 A1* | 9/2008 | Reid | H03M 7/30 |
| 2009/0037284 A1* | 2/2009 | Lewis | G06Q 20/20 705/16 |
| 2009/0083474 A1* | 3/2009 | Cooke | G06F 3/0607 711/103 |
| 2009/0217257 A1* | 8/2009 | Huang | G06F 8/65 717/168 |
| 2009/0279549 A1 | 11/2009 | Ramanathan et al. | |
| 2010/0023777 A1* | 1/2010 | Prevost | G06F 21/572 713/180 |
| 2010/0136913 A1 | 6/2010 | Picquenot et al. | |
| 2010/0159907 A1* | 6/2010 | Farley | G06Q 20/20 455/418 |
| 2010/0257067 A1* | 10/2010 | Chan | G06Q 20/102 705/21 |
| 2010/0274712 A1 | 10/2010 | Mestre et al. | |
| 2010/0287083 A1* | 11/2010 | Blythe | G06Q 30/06 705/35 |
| 2010/0312692 A1* | 12/2010 | Teicher | G06Q 20/10 705/39 |
| 2011/0078081 A1 | 3/2011 | Pirzadeh et al. | |
| 2011/0110234 A1 | 5/2011 | Pulijala et al. | |
| 2011/0119680 A1 | 5/2011 | Li et al. | |
| 2011/0155800 A1 | 6/2011 | Mastrangelo et al. | |
| 2011/0173691 A1* | 7/2011 | Baba | G06F 21/445 726/10 |
| 2011/0202415 A1 | 8/2011 | Casares et al. | |
| 2012/0011062 A1 | 1/2012 | Baker et al. | |
| 2012/0117568 A1 | 5/2012 | Plotkin | |
| 2012/0132712 A1 | 5/2012 | Babu et al. | |
| 2012/0135681 A1 | 5/2012 | Adams et al. | |
| 2012/0143703 A1 | 6/2012 | Wall et al. | |
| 2012/0166491 A1* | 6/2012 | Angus | G06F 11/3006 707/802 |
| 2012/0193434 A1 | 8/2012 | Grigg et al. | |
| 2012/0196531 A1 | 8/2012 | Posch et al. | |
| 2012/0198434 A1 | 8/2012 | Dirstine et al. | |
| 2012/0221466 A1* | 8/2012 | Look | G06Q 20/20 705/39 |
| 2012/0278795 A1 | 11/2012 | Bouchier et al. | |
| 2013/0040566 A1 | 2/2013 | Mourtel et al. | |
| 2013/0125107 A1* | 5/2013 | Bandakka | G06F 11/1417 717/171 |
| 2013/0254110 A1 | 9/2013 | Royyuru et al. | |
| 2013/0283256 A1* | 10/2013 | Proud | G06F 8/65 717/172 |
| 2013/0290234 A1 | 10/2013 | Harris et al. | |
| 2013/0290945 A1 | 10/2013 | Sawal et al. | |
| 2013/0335199 A1 | 12/2013 | Jonely | |
| 2013/0346302 A1 | 12/2013 | Purves et al. | |
| 2014/0001263 A1 | 1/2014 | Babu et al. | |
| 2014/0081849 A1 | 3/2014 | Varvarezis | |
| 2014/0108704 A1 | 4/2014 | Boring | |
| 2014/0109076 A1* | 4/2014 | Boone | G06F 8/65 717/170 |
| 2014/0136350 A1 | 5/2014 | Savolainen | |
| 2014/0138435 A1 | 5/2014 | Khalid | |
| 2014/0225713 A1 | 8/2014 | McIntyre et al. | |
| 2014/0256254 A1 | 9/2014 | Sarda et al. | |
| 2014/0263625 A1 | 9/2014 | Smets et al. | |
| 2014/0297530 A1 | 10/2014 | Eckel et al. | |
| 2014/0317611 A1* | 10/2014 | Wojcik | G06F 8/71 717/168 |
| 2014/0365776 A1 | 12/2014 | Smets et al. | |
| 2015/0039455 A1* | 2/2015 | Luciani | G06Q 20/36 705/17 |
| 2015/0058145 A1 | 2/2015 | Luciani | |
| 2015/0161594 A1 | 6/2015 | Jarman et al. | |
| 2015/0178730 A1 | 6/2015 | Gleeson et al. | |
| 2015/0287031 A1 | 10/2015 | Radu et al. | |
| 2015/0348009 A1 | 12/2015 | Brown et al. | |
| 2015/0381203 A1 | 12/2015 | Master et al. | |
| 2016/0007292 A1 | 1/2016 | Weng et al. | |
| 2016/0183032 A1 | 6/2016 | Pogorelik et al. | |
| 2016/0188896 A1* | 6/2016 | Zatko | G06F 21/6218 726/30 |
| 2016/0188909 A1* | 6/2016 | Zatko | G06F 21/71 726/26 |
| 2016/0217465 A1 | 7/2016 | Gaur et al. | |
| 2016/0226519 A1 | 8/2016 | Meng et al. | |
| 2017/0083879 A1 | 3/2017 | Vadera | |
| 2017/0200177 A1 | 7/2017 | Psillas | |
| 2017/0286093 A1 | 10/2017 | Steshenko et al. | |
| 2017/0308882 A1* | 10/2017 | Bedier | G06Q 20/204 |
| 2018/0005223 A1 | 1/2018 | Terra et al. | |
| 2018/0005226 A1 | 1/2018 | Terra et al. | |
| 2018/0005237 A1 | 1/2018 | Terra et al. | |

FOREIGN PATENT DOCUMENTS

| | | | |
|---|---|---|---|
| EP | 1408459 A1 * | 4/2004 | G06Q 20/347 |
| GB | 2468774 A | 9/2010 | |
| GB | 2519798 A | 5/2015 | |
| KR | 2003-0086818 A | 11/2003 | |

(56) References Cited

FOREIGN PATENT DOCUMENTS

| WO | 2013/106723 A2 | 7/2013 |
| WO | 2013/126996 A1 | 9/2013 |
| WO | 2017/053699 A1 | 3/2017 |
| WO | 2017/172953 A1 | 10/2017 |
| WO | 2018/005475 A1 | 1/2018 |
| WO | 2018/005717 A1 | 1/2018 |

OTHER PUBLICATIONS

Non-Final Office Action dated Jul. 29, 2016, for U.S. Appl. No. 15/052,790, of Vadera, K., filed Feb. 24, 2016.
Non-Final Office Action dated Nov. 16, 2016, for U.S. Appl. No. 15/197,708, of Terra, D., et al., filed Jun. 29, 2016.
Notice of Allowance dated Nov. 23, 2016, for U.S. Appl. No. 15/052,790, of Vadera, K., filed Feb. 24, 2016.
Non-Final Office Action dated Jan. 31, 2017, for U.S. Appl. No. 15/197,706, of Terra, D., et al., filed Jun. 29, 2016.
Notice of Allowance dated May 18, 2017, for U.S. Appl. No. 15/086,024, of Steshenko, R., et al., filed Mar. 30, 2016.
Notice of Allowance dated Jun. 2, 2017, for U.S. Appl. No. 15/197,708, of Terra, D., et al., filed Jun. 29, 2016.
Non-Final Office Action dated Jul. 19, 2017, for U.S. Appl. No. 15/086,025, of Steshenko, R., et al., filed Mar. 30, 2016.
Final Office Action dated Aug. 15, 2017, for U.S. Appl. No. 15/197,706, of Terra, D., et al., filed Jun. 29, 2016.
Advisory Action dated Nov. 30, 2017, for U.S. Appl. No. 15/197,706, of Terra, D., et al., filed Jun. 29, 2016.
Final Office Action dated Dec. 5, 2017, for U.S. Appl. No. 15/086,025, of Steshenko, R., et al., filed Mar. 30, 2016.
Notice of Allowance dated May 23, 2018, for U.S. Appl. No. 15/052,792, of Vadera, K., filed Feb. 24, 2016.
Notice of Allowance dated Jun. 6, 2018, for U.S. Appl. No. 15/086,025, of Steshenko, R., et al., filed Mar. 30, 2016.
Non-Final Office Action dated Jun. 15, 2018, for U.S. Appl. No. 15/197,711, of Terra, D., et al., filed Jun. 29, 2016.
International Search Report and Written Opinion for International Application No. PCT/US2016/053303, dated Dec. 7, 2016.
International Search Report and Written Opinion for International Application No. PCT/US2017/024802, dated Jun. 7, 2017.
International Search Report and Written Opinion for International Application No. PCT/US2017/039858, dated Sep. 8, 2017.
International Search Report and Written Opinion for International Application No. PCT/US2017/039480, dated Oct. 18, 2017.

* cited by examiner

MODULAR FIRMWARE FOR TRANSACTION SYSTEM

BACKGROUND

Electronic payment techniques have been developed that limit the possibility of fraudulent payment transactions. A Europay/Mastercard/Visa ("EMV") system may be implemented with a passive electronic circuit that is a component of the payment card. Power is provided to the passive electronic circuit via a payment terminal that physically engages the passive electronic circuit or via inductive coupling with a wireless carrier signal that is transmitted by the payment terminal. The passive electronic circuit activates and communicates with the payment terminal via the physical or interface or by modulation of the wireless carrier signal. Payment information is encrypted by the passive electronic circuit prior to transmission to the payment terminal.

Near field communication ("NFC") systems facilitate the transfer of data between electronic devices such as smart phones, smart watches, and tablets. NFC payment systems have been implemented in which an electronic device communicates payment information with a payment terminal that provides a wireless carrier signal. The electronic device and payment terminal communicate by modulating the wireless carrier signal. As with EMV payment systems, the NFC-enabled device may only send encrypted payment information to the payment terminal.

A payment terminal that processes EMV and NFC transactions may include hardware and software to perform a number of complex operations. The payment terminal may include physical and wireless interfaces for communicating with the chip cards or NFC devices. Transaction processing and encryption programs may be used to process payment information, and communication hardware and software may be necessary to communicate with a payment server or other electronic devices. A payment terminal may also implement numerous other functions such as user interface functions and input/output functions.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
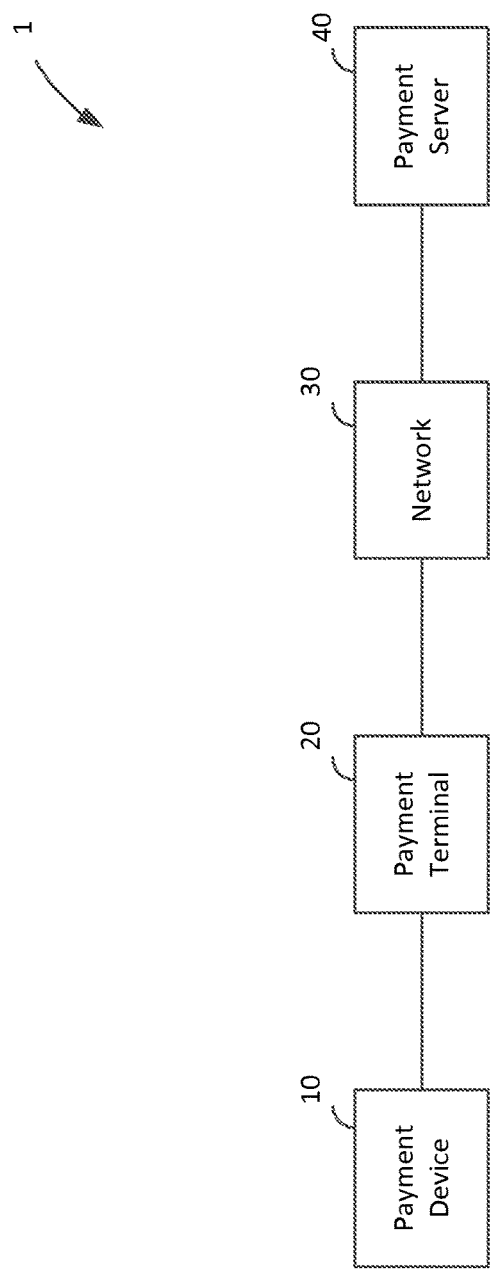
FIG. 1 shows an illustrative block diagram of a payment system in accordance with some embodiments of the present disclosure.

A payment reader provides an interface between a point-of-sale application running on a seller mobile device and a payment device such as an EMV chip card or an NFC payment device. A payment transaction is initiated such as by a merchant at the point-of-sale application. The point-of-sale application communicates with the payment reader through a communication interface, and the payment reader proceeds to process the transaction. The payment reader initiates communication with the payment device using near field communications or, if the customer has inserted the chip card in a slot of the payment reader, via a direct electrical connection with the chip card.

Once the payment information is received from the payment device, the payment reader will process the transaction in accordance with a transaction processing procedure. For example, the payment reader may select a transaction processing procedure based on the type of payment that is provided by the user (e.g., Visa, Mastercard, etc.). The payment reader will then process the payment according to the transaction processing procedure, including encrypting payment information for eventual communication to a payment server. The payment reader communicates with the point-of-sale application (e.g., using a wireless connection such as Bluetooth) and the point-of-sale application communicates with a payment server such as by an internet protocol (IP) connection. The payment server determines whether the transaction is approved and communicates this back to the point-of-sale application and the payment reader.

The payment reader has a memory that stores instructions for performing the functions of the payment reader and a processor for executing those instructions. The instructions are implemented in firmware and are divided into a number of firmware modules for handling different functions that are performed by the payment reader. A payment application module has instructions for operating the payment application and a host communication module has instructions for communicating with a point-of-sale application running on a merchant device such as a tablet or smart phone. When a payment transaction takes place, a contactless module and contact module have instructions for receiving payment information from a chip card or a mobile device running an NFC payment application.

The payment is processed according to instructions stored in one of a plurality of transaction processing modules. Each transaction processing module has instructions for processing transactions in accordance with the requirements of an issuing company. For example, the transaction processing modules may be certified according to a certification program such as EMVCo. The particular transaction processing module that is accessed for any particular transaction may be based on the issuing company that is associated with the payment method.

Each transaction processing module may be an independent firmware module, and may be compiled separately from all other firmware modules as position independent code. Each transaction processing module may then be stored in a distinct portion of the memory. When a transaction processing module needs to be updated, new firmware is generated for the transaction processing module and the original firmware for that transaction processing module is replaced. This update can be performed without modification to any other transaction processing module or any other firmware modules. Similarly, updates to other firmware modules do not impact a transaction processing module.

FIG. 1 depicts an illustrative block diagram of a payment system 1 in accordance with some embodiments of the present disclosure. In one embodiment, payment system 1 includes a payment device 10, payment terminal 20, network 30, and payment server 40. These components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 is depicted as a single simplified block, it will be understood that payment server 40 may include any suitable number of servers operated by any suitable entities, such as a payment service system and one or more banks of the merchant and customer. The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment reader, for example, at a screen of a payment terminal. In other embodiments such as a smart phone or watch operating as an NFC payment device, information about the approved transaction and additional information (e.g., receipts, special offers, coupons, or loyalty program information) may be provided to the NFC payment device for display at a screen of the smart phone or watch or storage in memory.

Figure 2:
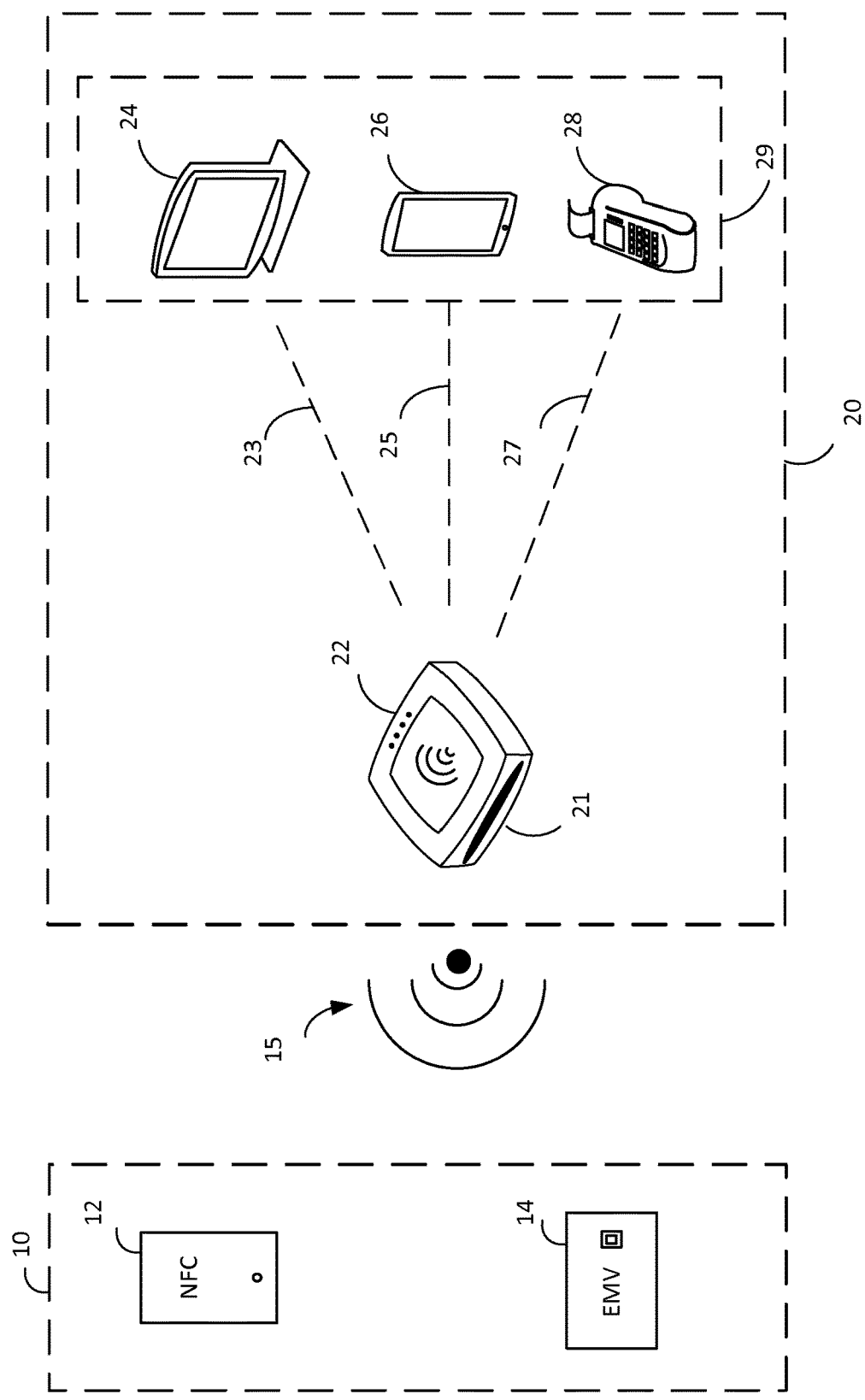
FIG. 2 depicts an illustrative block diagram of payment device and payment reader in accordance with some embodiments of the present disclosure.

FIG. 2 depicts an illustrative block diagram of payment device 10 and payment reader 20 in accordance with some embodiments of the present disclosure. Although it will be understood that payment device 10 and payment reader 20 of payment system 1 may be implemented in any suitable manner, in one embodiment the payment reader 20 may comprise a payment reader 22 and merchant device 29. The reader 22 of payment terminal 20 may facilitate transactions between the payment device 10 and a merchant device 29 running a point-of-sale application.

In one embodiment, payment device 10 may be a device that is capable of communicating with payment terminal 20 (e.g., via payment reader 22), such as an NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on processor in accordance with a host card emulation routine) for performing secure transaction functions. During a payment transaction NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15 it is inductively coupled to the payment reader 22. Thus, the payment device 10 is also capable of modulating the wireless carrier signal via active or passive load modulation. By changing the tuning characteristics of the antenna of payment device 10 (e.g. by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or dedicated payment terminal 28. In the case of a computing device such as tablet payment device 24 or mobile payment device 26, a point-of-sale application may provide for the entry of purchase and payment information, interaction with a customer, and communications with a payment server. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, lightning) or wireless (e.g., Wi-Fi, Bluetooth, NFC, or ZigBee) connection, in one embodiment payment reader 22 may communicate with the merchant device 29 via a Bluetooth or Bluetooth low energy interface. As described herein, in some embodiments processing of the payment transaction may occur locally on payment reader 22 and merchant device 29, for example, when a transaction amount is small or there is no connectivity to the payment server. In other embodiments, merchant device 29 or payment reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format.

Figure 3:
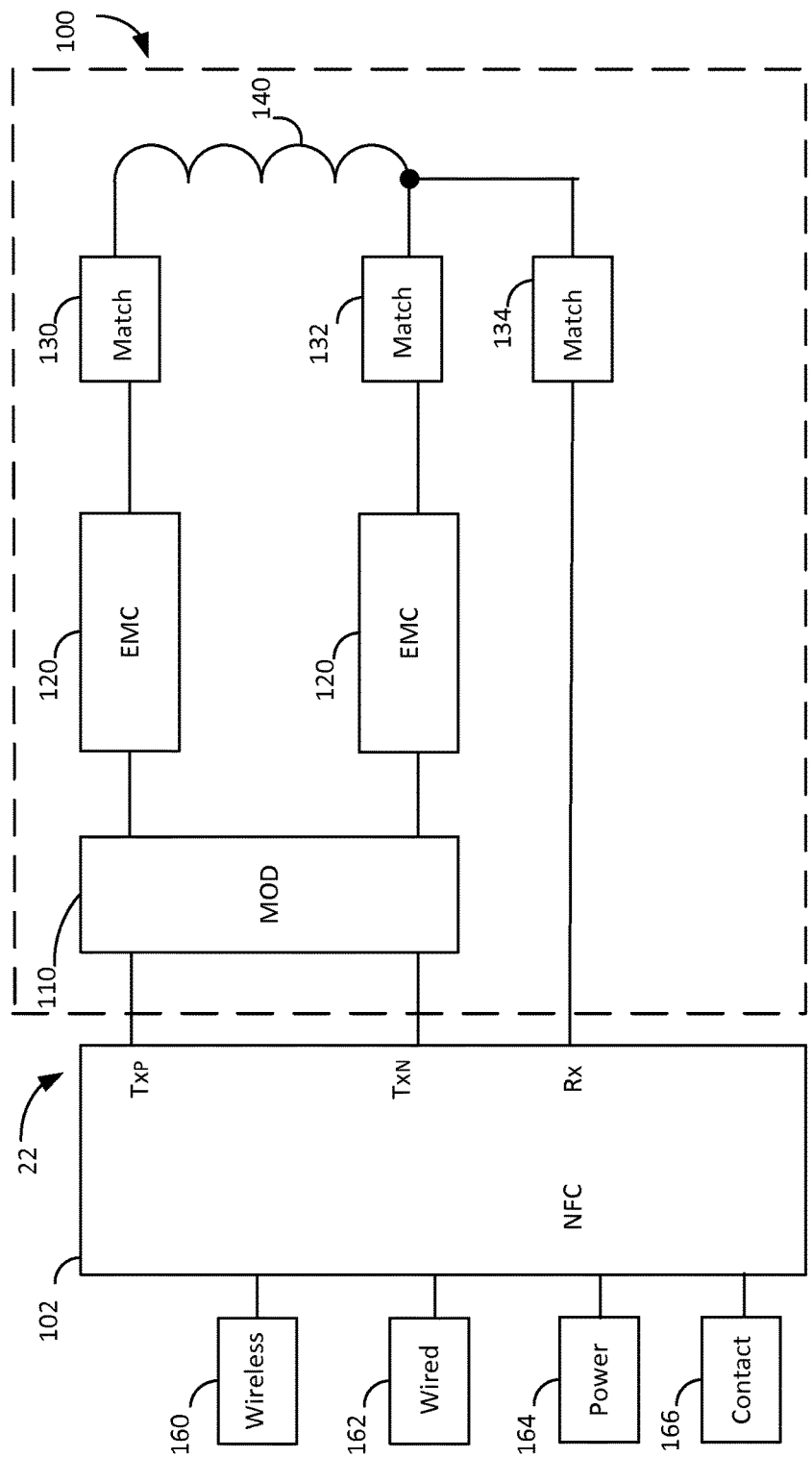
FIG. 3 depicts a block diagram of a payment reader in accordance with some embodiments of the present disclosure.

FIG. 3 depicts a block diagram of payment reader 22 in accordance with some embodiments of the present disclosure. Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in any suitable manner. Among other functions, payment reader 22 may operate as a NFC communication device for exchanging data with a contactless payment device such payment device 10. In one embodiment, payment reader 22 includes NFC chip 102, NFC circuit 100, wireless communication interface 160, wired communication interface 162, power supply 164, and contact interface 166. Although the NFC circuit 100 and the contact interface 166 are examples of types of payment interfaces that may be included within payment reader 22, it will be understood that any suitable payment interface (e.g., a magnetic card reader) may be included within payment reader 22 in accordance with the embodiments of the present disclosure.

NFC chip 102 of payment reader 22 may include any suitable hardware, software, memory, and circuitry as is necessary to perform and control the functions of payment reader 22. In one embodiment, NFC chip 102 includes one or more processors that execute instructions stored in memory of NFC chip 102 to control the operations and processing of payment reader 22. As used herein, a processor may include one or more processors having processing capability necessary to perform the processing functions described herein, including but not limited to hardware logic, computer readable instructions running on a processor, or any suitable combination thereof. A processor may run software to perform the operations described herein, including software accessed in machine readable form on a tangible non-transitory computer readable storage medium, as well as software that describes the configuration of hardware such as hardware description language (HDL) software used for designing chips.

In one embodiment, NFC chip 102 may include two RISC processors configured to perform general processing and cryptographic processing functions, respectively, based on executable instructions stored in respective memory. As used herein, memory may refer to a tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

NFC chip 102 may also include additional circuitry such as interface circuitry, analog front end circuitry, and security circuitry. In one embodiment, interface circuitry may include circuitry for interfacing with a wireless interface 160 (e.g., Wi-Fi, Bluetooth, and Bluetooth low energy), circuitry for interfacing with a wired interface 162 (e.g., USB, Ethernet, FireWire, and lightning), circuitry for interfacing with other communication interfaces or buses (e.g., I²C, SPI, UART, and GPIO), circuitry for interfacing with power interface 164 (e.g., power management circuitry, power conversion circuitry, rectifiers, and battery charging circuitry), and circuitry for interfacing with contact interface 166 (e.g., power and communication circuitry for interfacing with an EMV chip of a chip card 14).

In one embodiment, analog front end circuitry of NFC chip 102 includes circuitry for interfacing with the analog components of NFC circuit 100 (e.g., electromagnetic compatibility (EMC) circuitry, matching circuits, and modulation circuitry). Security circuitry of NFC chip 102 may include the circuitry for protecting sensitive information such as encryption keys, merchant information, and customer information. In one embodiment, security circuitry may include tamper protection circuitry and electronic fuses for selectively cutting off power or disabling one or more components of NFC chip in response to attempts to obtain improper access to NFC chip 102, as described in more detail herein.

Wireless interface 160 includes hardware and software for communicating with external electronic devices wirelessly, such as Wi-Fi, Bluetooth, or Bluetooth low energy. Wired Interface 162 includes hardware, software, and a physical interface to facilitate wired communications with an external electronic device via an interface such as USB, Ethernet, FireWire, or lightning. Using the wireless interface 116 and wired interface 162, payment reader 22 may communicate with external electronic devices such as a merchant device 29. In some embodiments, payment reader 22 may communicate with other electronic devices such as a remote server, (e.g., to provide payment or transaction information directly to the server, receive updates from a server, or communicate certification or approval data with the server), or with another electronic device.

Power supply 164 may include one or more power supplies such as a physical connection to AC power or a battery. Power supply 164 may include power conversion circuitry for converting AC power and/or generating a plurality of DC voltages for use by components of payment reader 22. When power supply 164 includes a battery, the battery may be charged via a physical power connection, via inductive charging, or via any other suitable method.

Contact interface 166 may be a suitable interface for providing power to a payment chip such as an EMV chip of a chip card 14 and communicating with the EMV chip. Contact Interface 166 may include a plurality of contact pins for physically interfacing with the chip card 14 according to EMV specifications.

NFC chip 102 of payment reader 22 is in communication with NFC circuit 100 via a plurality of pins such as a positive transmit pin ($T_{XP}$), negative transmit pin ($T_{XN}$), and a receive pin ($R_X$). Transmit pins $T_{XP}$ and $T_{XN}$ may provide output signals having an amplitude, frequency, and waveform. In one embodiment, the signals provided from $T_{XP}$ and $T_{XN}$ may be differential square wave signals and may be provided to modulation circuitry 110 of NFC circuit 100.

Modulation circuit 110 may include circuitry (e.g., H-bridge circuitry) for outputting a modulated signal in accordance with the outputs of $T_{XP}$ and $T_{XN}$. Modulation circuit 110 may also perform other functions such as applying an increased voltage that is suitable for transmission over antenna 140. The output of modulation circuit 110 may be provided to EMC circuit 120. EMC circuit 120 may include one or more components such inductors and capacitors in order to provide acceptable electromagnetic compatibility with other high-frequency signals. The output of EMC circuit 120 may be provided to matching circuit 130. Matching circuit 130 may include suitable components such as resistors, inductors, and capacitors to provide for impedance matching and tuning of antenna 140.

Collectively, the modulation circuit 110, EMC circuit 120, and matching circuit 130 may form a transmit circuit that is coupled to antenna 140. However, it will be understood that the transmit circuit may include any suitable circuitry that couples the NFC chip 102 (e.g., the outputs of the processing unit thereof as indicated by the $T_{XP}$ and $T_{XN}$ pins), that the circuit components depicted in FIG. 3 may be arranged in any suitable manner, and that any suitable components may be added or omitted therefrom.

During operation of NFC chip 102 of payment reader 22, transmit pins $T_{XP}$ and $T_{XN}$ may output either a carrier signal or a modulated signal. A carrier signal may be a signal having a fixed frequency such as 13.56 MHZ. The carrier signal is provided to modulation circuit 110 which may modify the output signal from NFC chip 102 in a uniform manner (e.g., by applying a voltage boost). Components of EMC circuit 120 and matching circuit 130 (e.g., resistors, inductors, and capacitors) modify the output waveform of the carrier signal, for example, by modifying the approximate square wave output such that the signal transmitted by the antenna 140 approximates a sine wave having the carrier frequency. A first portion of the transmit circuit thus couples the output of the $T_{XP}$ pin to a first terminal of antenna 140 while a second portion of the transmit circuit couples the output of the $T_{XN}$ pin to a second terminal of antenna 140. The carrier signal is then transmitted over antenna 140 as a wireless carrier signal.

When modulation is applied to the carrier signal by NFC chip 102, modulation circuit 110 may output a modulated signal that varies from the carrier signal in its amplitude, phase, or both in response to a data signal. As is described herein, NFC chip 102 may implement a modulation procedure in order to generate the modulated signal, either alone or in combination with the modulation circuit 110. This modulated signal is provided to the transmit circuit and transmitted over antenna 140 as a wireless data signal.

NFC chip 102 monitors the signal at antenna 140 through receive pin $R_X$. The receive pin $R_X$ is coupled to a receive circuit, which in one embodiment may include matching circuit 134 and may be coupled to a second terminal of antenna 140. In this manner, NFC chip 102 may monitor what is being transmitted (e.g., the wireless carrier and modulated signals) as well as changes that are applied to the carrier signal by a contactless payment device 10 such as NFC device 12 or chip card 14. Based on these modulations of the received signal, NFC chip 102 is able to receive communications from the contactless payment device 10.

Figure 4:
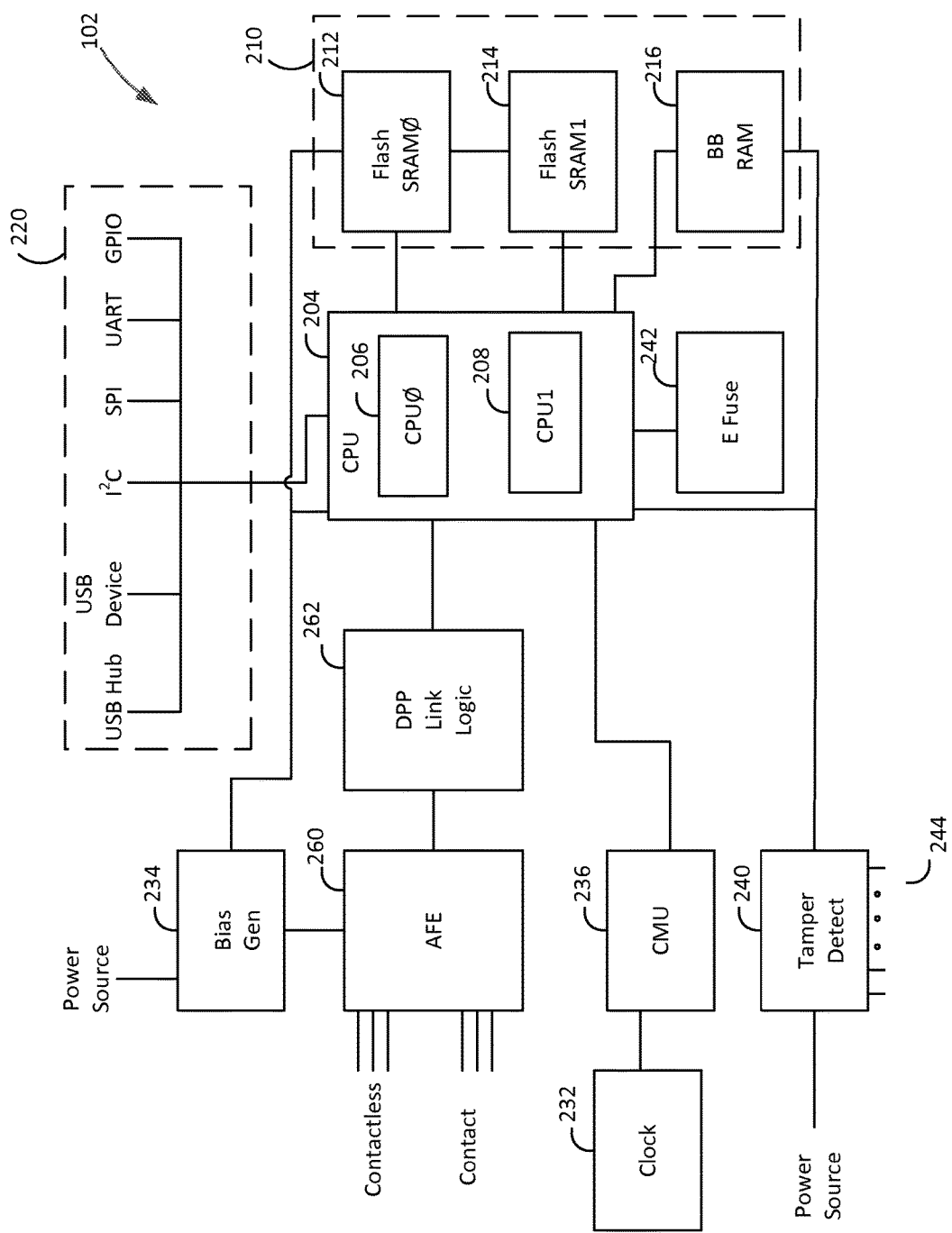
FIG. 4 depicts a block diagram of components of an NFC chip in accordance with some embodiments of the present disclosure.

FIG. 4 depicts a block diagram of components of NFC chip 102 in accordance with some embodiments of the present disclosure. Although particular components are depicted in a particular configuration in FIG. 4, it will be understood that NFC chip 102 may include additional components, certain components may not be included in NFC chip 102, and components of NFC chip 102 may be rearranged in any suitable manner.

In one embodiment, NFC chip 102 may include a processing unit 204 and memory 210. In one embodiment, processing unit 204 may include two CPUs labeled as CPU0 206 and CPU1 208. CPU0 206 may be a general processor that controls most functions of the NFC chip 102. CPU 208 may be a cryptographic processor that is physically separated from other components of NFC chip 102 (not depicted) such that even if one or more components of NFC chip 102 (e.g., CPU0 206) are compromised, the processor CPU1 208 and its associated memory (e.g., flash SRAM1 214) of the cryptographic unit may not be compromised.

In one embodiment, CPU0 206 and CPU1 208 may be RISC processors. Although memory 210 may include a suitable memory, in one embodiment each of CPU0 206 and CPU1 208 may have associated flash SRAM such as flash SRAM0 212 and flash SRAM1 214, respectively. Flash SRAM0 212 and flash SRAM1 214 may store instructions for execution on respective CPUs CPU0 206 and CPU1 208 and may also store data for use during operation of NFC chip 102. Battery-backed RAM 216 may be a separate memory that stores highly sensitive information such as encryption keys. In this manner, if NFC chip 102 is compromised, the information stored in battery-backed RAM 216 may be erased, for example, by removing power to battery-backed RAM 216.

Processing unit 204 (e.g., CPU0 206 of processing unit 204) may interface with one or more communication interfaces 220. Communication interfaces 220 may enable communication with external devices and other circuitry of payment reader 22. For example, communication interfaces 220 may enable communications with circuitry of payment reader 22 such as wireless communication circuitry (e.g., Wi-Fi, Bluetooth, Bluetooth low energy), power management circuitry of payment reader 22, wired communication interfaces of payment reader 22 (e.g., Ethernet, USB, FireWire, lightning) and other components of payment reader 22. Exemplary communication interfaces 220 include a USB hub, USB device, I$^2$C, SPI, UART, and GPIO.

NFC chip 102 also includes bias generator 234, clock 232, clock management unit 236, tamper detect circuit 240, and electronic fuse 242. Bias generator 234 may be connected to a power source and may generate a bias voltage that is provided to components of NFC chip 102 such as analog front end 260, processing unit 204, and memory 210. In one embodiment, a suitable bias voltage generated by bias generator 234 may be 3.3 volts. Clock 232 may be any suitable clock such as crystal oscillator and may provide a clock signal at a clock frequency to clock management unit 236. Clock management unit 236 may generate a plurality of clock signals based on the input from clock 232, for example, to provide a clock signal for CPU0 206 and CPU1 208 of processing unit 204 and a clock signal having a suitable frequency for transmission for near field communications (e.g., 13.56 MHZ).

Tamper detect 240 is connected to the power source. Tamper detect 240 includes tamper detect inputs 244 which may be coupled to one or more electrical or physical components of NFC chip 102 or payment reader 22. If one of these inputs indicates that there has been attempt to tamper with one or more components of payment reader 22, tamper detect 240 may shut off power to one or more components of NFC chip 102. Although tamper detect 240 is depicted in communication with only processing unit 204 and battery backup RAM 216, it will be understood that tamper detect 240 may provide interruption of power to any other component of NFC chip 102 such as flash SRAM0 212 and flash SRAM1 214.

NFC chip 102 also includes electronic fuses 242. Electronic fuses 242 may be provided to disable power or communications to one of more components of NFC chip 102. For example, electronic fuses 242 may be controlled by CPU1 208. In the event that an improper access attempt or usage of NFC chip 102 is identified by CPU1 208, CPU1 may activate one or more electronic fuses 242 in order to shut off power to one or more components of NFC chip 102, to shut off the clock signal to one or more components of NFC chip 102, or to shut off communications between one or more components of NFC chip 102. For example, CPU1 208 may control a subset of electronic fuses 242 in a manner such that CPU0 206 is unable to operate or communicate with CPU1 208.

NFC chip 102 also includes analog front end 260 and DPP link logic 262. DPP link logic 262 may provide an interface between the digital signals from CPU0 206 of processing unit 204 and the analog signals of analog front end 260. Analog front end 260 provides the interface to the contactless interface (e.g., the NFC circuit 100) and to a contact interface for chip cards.

During operation, clock 232 provides a clock signal to CMU 236, which provides a plurality of clock signals to processing unit 204. Tamper detect 240 monitors inputs 244, and in the absence of a tamper attempt power may be supplied to components of NFC chip 102 in a normal manner. In the absence of any improper attempt to access NFC chip 102, CPU1 208 may control electronic fuse 242 such that the components of NFC chip 102 are able to operate normally.

The merchant device 29 may be in communication with Bluetooth communication circuitry of payment reader 22, which may be in communication with CPU0 206 via communication interface 220. In one embodiment, merchant device 29 may transmit a request to receive payment to NFC chip 102 which may be received by CPU0 206. CPU0 206 may process the request according to instructions stored in flash SRAM0 212 and may activate one or both of the contactless interface (e.g., NFC circuit 100) or the contact interface via DPP link logic 262 and analog front end 260. With respect to the contactless interface, CPU0 206 may function as in a near field communication initiator, providing a carrier signal and modulated signal via DPP link logic 262, analog front end 260, and contactless interface. CPU0 206 may monitor for a response from a target (e.g., NFC device 12 or EMV device 14) via the contactless interface, analog front end 260, and DPP link logic 262.

Once communication is established with a payment device such as either a contactless device (e.g., an NFC device or a chip card) via the contactless circuit or a contact card via the contact interface, CPU0 206 may communicate with the payment device to process a payment transaction. During this process CPU0 206 may communicate with CPU1 208 in order for CPU208 to perform cryptographic functions. In some embodiments, CPU0 206 and CPU1 208 may process a transaction locally, while in some embodiments CPU0 206 may communicate with the merchant device 29 or directly with a payment server 40 via communication interface 220 and associated communication circuits (e.g., Wi-Fi, Bluetooth, Ethernet).

Figure 5:
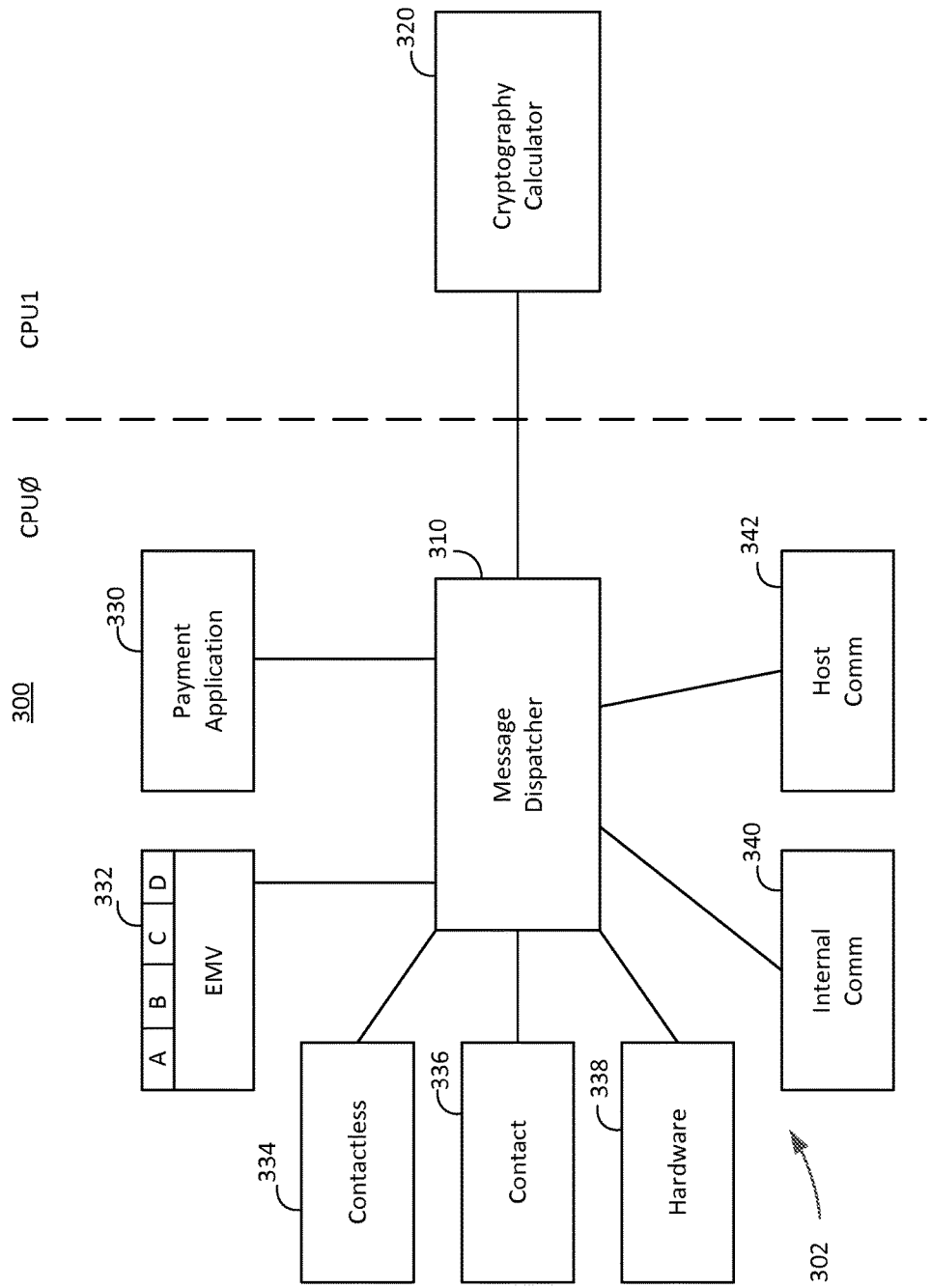
FIG. 5 depicts a software block diagram for a payment reader in accordance with some embodiments of the present disclosure.

FIG. 5 depicts a software block diagram 300 for a payment reader 22 in accordance with some embodiments of the present disclosure. Each block of software block diagram 300 represents a firmware module. Although particular firmware modules are depicted in FIG. 5, it will be understood that payment reader 22 may include additional firmware modules, or that one or more firmware modules may modified or removed. Moreover, while FIG. 5 depicts all of the firmware modules except for cryptography calculator 320 running on CPU0, with cryptography calculator 320 running on a separate processor CPU1, it will be understood that all of the firmware modules may run on a single CPU or may be allocated among a plurality of CPUs in any suitable manner.

In one embodiment, cryptography calculator 320 may be located on separate CPU (e.g., CPU1) such that cryptographic functions are executed separately from other functions of the NFC chip 102 of the payment reader 22. In addition, encryption keys and other high-value information may be accessed only by cryptography calculator 320 on CPU1. In this manner, high-value and secret information may be isolated from the remainder of the software of the NFC chip 102 and the payment reader 22.

Software system 302 includes a message dispatcher module 310 that manages the operations and interactions between the other firmware modules, which are functional modules. The functional modules may provide messages to the message dispatcher module 310. Message dispatcher module 310 manages those messages through a queued data structure mechanism and distributes the messages from the queued data structure to the functional modules. As described herein, a pointer may reference the location of a message in the queued data structure. Although the message may be provided to a functional module in any suitable manner (e.g., a copy of the message may be provided to a memory location that is accessed by the functional module), in one embodiment a reference to the pointer location may be provided to the functional module such that the functional module may access the memory location that is associated with the message within the queued data structure and, in some embodiments, edit data within the message such as one or more flags.

With respect to the software modules of CPU0, processing of CPU0 passes between the message dispatcher module 310 and a functional module, and the functional module executes its instructions until processing of CPU0 again returns to the message dispatcher module 310. In this manner, a message may be provided to one functional module at a time in a particular order. In one embodiment, the message dispatcher module may monitor message fields or flags to determine which of the functional modules should receive a message, whether the message should continue to be distributed to other functional modules, whether to distribute the message only once to each of the functional modules that is to receive the message, the order of distribution of the message to the functional modules, and whether the message should be returned to the queued data structure.

In one embodiment, the message dispatcher 310 implements the queued data structure as a circular queue having an array of messages or a linked list of messages, having respectively a pointer to the start of the queue (e.g., the top of front of the queue) and a pointer to the end of the queue (e.g., the bottom or end of the queue). Such a circular queue may be first-in first-out (FIFO) queue, with any new message that is to be enqueued inserted at the next location in memory after the last message in the queue. The end pointer is then modified to point to the location of the newly enqueued message. A message is discarded by moving the front pointer to from its current location to the next message at the front of the queue. The queue is circular in that it may wrap around the portion of memory that includes the queue, with old messages (i.e., messages that are not located between the start pointer and the end pointer) being overwritten as the pointers cycle through the circular queue. If the queue is full (i.e., the next message to be enqueued would overwrite the message stored at the location of the start pointer) additional memory may be allocated to the queue or an exception may be provided.

Although a circular queue (i.e., a queue) will be discussed in accordance with the embodiments described herein, it will be understood that any suitable queued data structure for storing messages and providing access to the messages may be provided. In another embodiment of a sequential queued data structure, the messaging system may be implemented as a push and pop stack. The push and pop stack may be a last-in first-out (LIFO) data structure in which any new message that is to be stored inserted at the location in memory before the first message in the stack. The stack may have an origin location and a pointer may point to the start of the queue. When a message is discarded, the pointer may be decremented toward the origin, and thus point to the next message. When a message is added to the stack, the pointer may be incremented away from the origin, and thus point to the newly added message. In an embodiment implementing a timed message that is returned to the queue as described herein, the contents of the stack may be modified to place the timed message at a location of the stack other than the start of the stack.

In some embodiments, a message is implemented as a message data structure, in memory, that includes a plurality of fields such as a message ID, a processed flag, and a data field. A message may have a message length and each field may be associated with a relative location within the message data structure. Once the location of the message within memory is known (e.g., based on a pointer), a particular field of a message may be accessed based on its relative location within the known message data structure. A message ID may indicate the type of message that is being sent. Based on this message ID, a functional module may determine whether to take action in response to a message and what action to take in response to the message. The processed flag may indicate to the message dispatcher module 310 that a message has been processed. The processed flag may be set by a functional module once the functional module completes processing in response to the message. Once the processed flag is set the message dispatcher module 310 may remove the message from the queue. A call me flag may indicate whether the module that provided the message should receive the message from the message dispatcher module. A data field may include data to be provided with a message for use by the functional module that takes action in response to the message. In some embodiments, the data field may include additional messages.

Message dispatcher module 310 may manage the queue in a different manner based on a message type. Although message dispatcher module 310 may process received messages according to any suitable message types, in one embodiment the message types may be a timed message and a standard message. A standard message may receive one-time processing within the queue. Once a standard message is processed, it may be removed from the queue. Until the standard message is processed, it may retain its position in the queue and move relative to the beginning of the queue (e.g., a pointer may move closer to the position of the standard message). A timed message may include a timing value and message distribution and queuing may be modified based on the timing value.

The timing value may be implemented in a number of ways. In one embodiment, the timed message may remain in the queue as long as the timing value has not expired and the processed flag is not set. When the timed message arrives at the start of the queue, it is distributed to the functional modules (e.g., a subset of the functional modules that are entitled to receive the timed message) in a round robin fashion until a field of the message is modified and indicates that the message should no longer be distributed, for example, by changing the timing value or a processed flag. In one embodiment, as long as none of the functional modules have set the processed flag and the timing value has not expired, the message is returned to the queue after being distributed to all of the functional modules that are supposed to receive the message (e.g., in some embodiments, only certain functional modules may receive timed messages, or the message may not be provided to the functional module that provided the message based on a call me flag). Other messages in the queue are then processed until the timed message returns to the start of the queue, at which time it is again distributed to the functional modules. If the processed flag is set, the timed message may be removed from the queue. If the timing value expires before the processed flag is set, this indicates that the timed message was not processed. The timed message may be removed from the queue and an error message such as a payment failure message associated with the timed message may be generated.

In another embodiment, the timed message may be returned to the queue as long as the timing value is not expired. Once the timing value is expired, the timed message is distributed to one or more of the functional modules. If a functional module wishes to reset the timing value for the timed message, it can either re-send the timed message or change a creation time associated with the timing value. If the timed message is to be removed from the queue, a processed flag may be set. In some embodiments, an error message such as a payment failure message associated with the timed message may be generated.

In one embodiment of a circular queue, memory may be allocated for the queue and messages added to the next available location of the queue. When distributing a message, the message dispatcher module 310 provides a pointer to the location within the queue where the queued message is located. The functional modules can access the fields of a queued message such as the message ID field, processed flag, and data fields based on the pointer. In this manner, the message dispatcher module 310 provides the messages to the functional modules and the functional modules are able to update the queued messages. Once the queued message has been processed, removed, or moved to a different location of the queue, the pointer may be moved to the next queued message.

The functional modules may generate messages in response to messages received from message dispatcher module 310. In addition, processing of a functional module may be initiated within a module and messages generated in response to some external stimulus such as a hardware or software interrupt. In response to an interrupt, the processing of CPU0 206 may pass to the functional module that is initialized in response to the interrupt.

The functional modules may include one or more communication modules such as an internal communication module 340. Internal communication module 340 may include instructions for communicating with internal communication interfaces 220 of NFC chip 102 such as a USB interface, I²C interface, SPI interface, UART interface, and GPIO interface. These interfaces may support communication with external devices (e.g., via the USB interface) or with internal hardware such as Wi-Fi, Bluetooth, or power control hardware. Communication with an external device or internal hardware of payment reader 22 may be initiated in any suitable manner, such as an interrupt provided via the communication interface. In response to the communication from the communication interface, internal communication module 340 may generate a message having a message ID and data that is indicative of the source of the communication, the data being communicated, and any other suitable information. These messages may be provided to message dispatcher module 310 to be distributed to one or more of the other functional modules. Internal communication module 340 may also receive messages to be transmitted to an external device or internal hardware of payment reader 22 from message dispatcher module 310. Such messages may have originated from other functional modules such as payment application module 330, host communication module 342, or hardware module 338.

Contactless module 334 may receive data to be transmitted and includes instructions for controlling near field communications between payment reader 22 and a payment device 10 such as NFC device 12 or chip card 14. Contactless module 334 provides for communications with such devices via a communication protocol such as those outlined in ISO14443 and ISO18092. Contactless module 334 may function as an initiator providing messages to the payment device 10 (e.g., the target). NFC Module 334 generates messages to facilitate communications with the payment device 10 via a modulated carrier signal and receives messages from a payment device 10 based on the payment device 10 modulating the carrier signal provided from an antenna of payment reader 22. These received messages may include payment information such as encrypted credit card numbers and in some embodiments may also include authentication information such as PIN numbers, fingerprint information, or other biometric information.

In some embodiments contactless module 334 may access messages from the queue of message dispatcher module 310 that may request information from payment device 10 or provide data to be sent payment device 10. For example, payment application module 330 may provide a message to the queue of message dispatcher module 310 that requests information relating to a limit for local processing of transactions. Contactless module 334 may access the message from the queue, and transmit a request for the local payment limit to the payment device 10 via the modulated carrier signal. Payment device 10 may respond with its payment limit by modulating the carrier signal. Contactless module 334 may generate a message based on the received data and provide the message to message dispatcher module 310. Message dispatcher 310 may distribute the message when it reaches the start of the queue, and payment application 330 may access this message to determine whether the local payment limit is less than the amount of the transaction. In other embodiments, contactless module 334 may provide data to be written to payment device 310, such as updates to payment parameters or keys of the payment device.

Contact module 336 may provide for communication with a contact device such as chip card 14. As described herein for contactless module 334, contact module 336 may interface with a payment device 10 and exchange messages with other functional modules of NFC software 302. Contact module 336 may communicate with chip card 14 via the contact interface of the payment reader 22 and with the other functional modules via messages sent to or accessed from the queue of message dispatcher module 310.

Although any suitable functional modules may utilize timed messages, in some embodiments, both contactless module 334 and contact module 336 may utilize timed messages during operation. For example, upon receiving a message to receive payment information from the payment device 10, contactless module 334 and contact module 336 may each provide a timed message to message dispatcher 310. This timed message may periodically arrive at the start of the queue at which time the message is distributed based on the timing value and it is determined by contactless module 334 or contact module 336 whether the payment information has been received. If the payment information has been received or if the functional module determines that processing of the timed message should end, the module receiving the payment information may modify the processed flag of the timed message and provide a message to the queue of message dispatcher model 310 indicating that the payment information has been received or a payment error has occurred. In one embodiment, until the payment information has been received or the timer runs out, the timed messages may continue to be distributed and returned to the queue. In another embodiment, the timing value may correspond to an amount of time during which payment information should have been received, and the timed message may only be sent to the functional modules once the timing value has expired. The timed message may then continue to be distributed or the timing value may be reset (e.g., by updating a creation time of the timed message), until the processed flag indicates that processing of the timed message should end. In some embodiments, an error message such as a payment failure message associated with the timed message may be generated.

NFC software 302 may also include a communication module such as a host communication module 342 for communicating with a host application. In one embodiment, a host application may be running on a different processor than NFC chip 102. For example, the host application may be running on another processor of payment reader 22, or in some embodiments as described herein, may be running on a merchant device 29. Although processing operations may be distributed between NFC software 302 and an external host application in any suitable manner, in one embodiment the host application may control user interface functions and communication with external devices such as payment server 40. NFC software 302 may handle payment processing (e.g., via payment application module 330 and EMV module 332), may interface with payment devices (e.g., via contactless module 334 and contact module 336), and may encrypt data that is to be transmitted to a payment server 40 (e.g., via cryptography calculator module 320). The instructions of host communication module 342 process data received from the host application, generate messages relating to the operation of the functional modules, and generate messages to be sent to the host application based on received messages.

Hardware module 338 may include instructions for communicating with internal hardware of payment reader 22. When a communication is received from internal communication module 340, and a message relating to that communication is queued at message dispatcher module 310, hardware module 338 may determine whether that message is from an internal component of payment reader 22. If the message is from an internal hardware component of payment reader 22, hardware module 338 may process the message and data and generate a responsive message to be queued at message dispatcher module 310 for processing by one or the other functional modules.

Payment application module 330 includes instructions for processing payment at payment reader 22. Payment application module 330 communicates with the host application via host communication module 342 and internal communication module 340 and also coordinates the operations of the functional modules that are used for payment processing (e.g., cryptography calculator module 320, EMV module 332, contactless module 334, and contact module 336). For example, when a payment transaction is initiated by a host application, payment application module 330 may retrieve a queued message from message dispatcher module 310 (e.g., that was initiated from host communication model 342) and processes the request for payment. Payment application module 330 may generate a message or messages to initialize one or more of contactless module 334 and contact module 336 to receive payment information (e.g., from an NFC device 12 or chip card 14).

When a message indicating that payment information was received arrives at the queue of message dispatcher module 310 and is received by payment application module 330, payment application module 330 may generate a message to access one or more transaction processing modules (indicated as A, B, C, and D) of EMV module 332. For example, each of the transaction processing modules A-D may correspond to a payment platform such as Europay, MasterCard, Visa, or American Express. Payment application module 330 may continue to communicate with the transaction processing module of EMV module 332 via queued messages at message dispatcher module 310, and may also provide messages that are accessed by cryptography calculator module 320. In some embodiments, payment application module 330 may process a transaction locally (e.g., for low value transactions), or in some embodiments may facilitate communications with a payment server 40 via merchant device 29. In either case, payment application module 330 may provide messages to message dispatcher module 310 that are accessed by host communication module 342, which communicates the results of the transaction approval process to the host application running on the merchant device 29 (e.g., via a Bluetooth connection accessed through internal communication module 340).

EMV module 332 includes instructions for processing payment transactions in accordance with one or more transaction processing procedures specified by a payment processor such as Europay, MasterCard, Visa, American Express, and other issuing companies. When payment information is received from contactless module 334 or contact module 336, payment application 330 may determine which transaction processing module to access from EMV module 332. Transaction processing modules of EMV module 332 (e.g., depicted in FIG. 5 as A, B, C, and D) are required to conform to specifications of the issuing company. Conformance with the specifications by processing modules of EMV module 332 may be confirmed by a certification process. EMV module 332 accesses the requested transaction processing module and communicates with other functional modules via messages queued at message dispatcher module 310.

Cryptography calculator module 320 includes instructions for performing cryptographic functions for payment processing transactions. Cryptography calculator module 320 may have access to keys that may be used to encrypt information that is sent to an external device such as payment server 40. Functional modules such as payment application module 330 and EMV module 332 may provide messages to the queue of message dispatcher 310 that cryptography calculator 320 may access. The messages that are accessed may include data to be encrypted. Cryptography calculator module 320 may perform the encryption on a separate processor (e.g., CPU1). Cryptography calculator module 320 may then generate a message including the encrypted data and provide that message to the queue of message dispatcher module 310. That message may be accessed from the queue (e.g., by payment application module 330) and eventually communicated to the payment server 40 (e.g., via messages provided to the queue of message dispatcher module 310 from payment application module 330, host communication module 342, and internal communication module 340, and via merchant device 29 to network 30).

Figure 6:
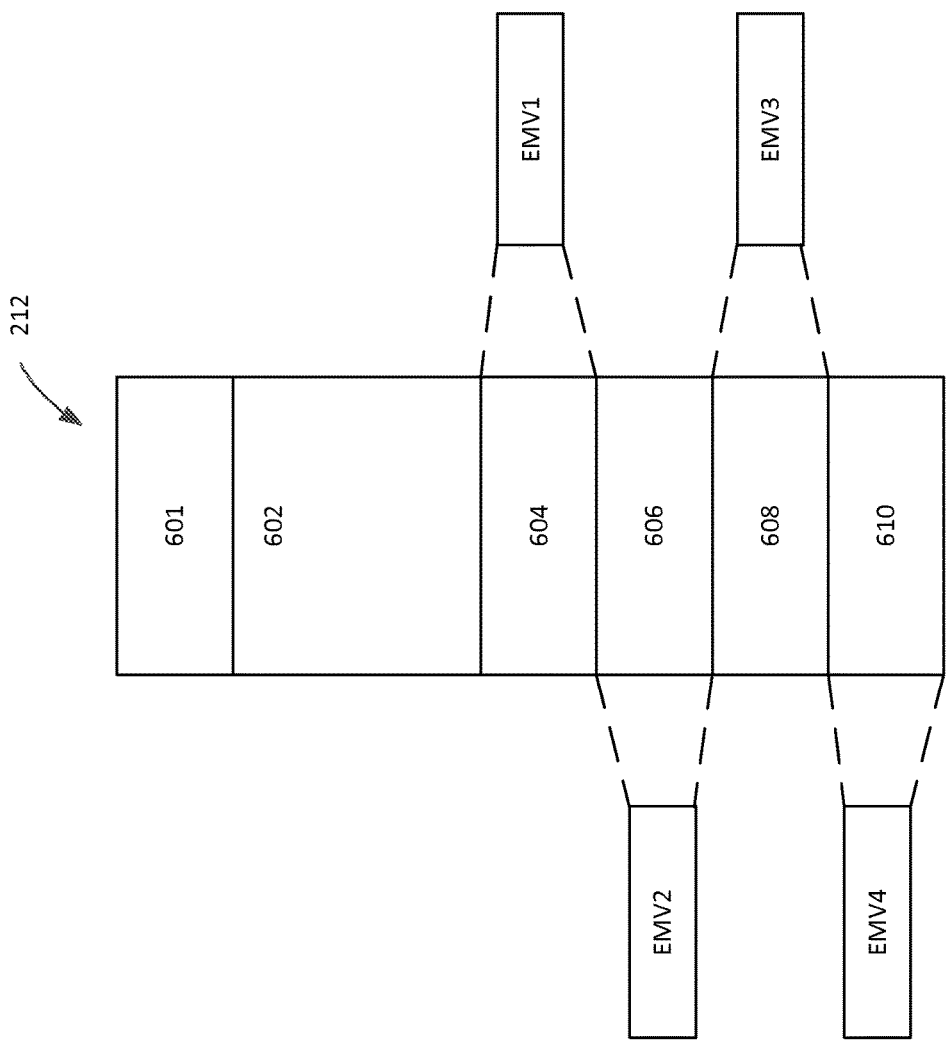
FIG. 6 depicts memory associated with firmware instructions of an NFC Chip.

FIG. 6 depicts memory associated with firmware instructions 600 of NFC Chip 102. The firmware instructions 600 may be generated and stored in the memory (e.g., flash SRAM0 212) such that the firmware is organized in a modular manner. In one embodiment, the firmware instructions 600 may include boot loader 601, operational instructions 602, and transaction processing modules 604, 606, 608, and 610.

Boot loader 601 may include instructions for initializing NFC chip 102 at the start of operation, such as during the power up of the payment reader 22. Operational instructions 602 may include instructions for controlling the operations of NFC chip 102 of payment reader 22, with the exception of instructions for cryptographic processing that may located on flash SRAM1 214 and the instructions located within the transaction processing modules 604, 606, 608, and 610.

The code that is the source for the operational instructions 602 may include various files and libraries related to functionality of the NFC chip such as user interface functions, operation of the payment application, the message dispatcher module, contact and contactless interface and communications, communications with the host merchant device 29, power management, and any other suitable functionality. In one embodiment, the operational instructions 602 may be compiled and linked as a single set of executable instructions, as depicted in FIG. 6.

FIG. 6 depicts four transaction processing modules labeled as EMV1 604, EMV2 606, EMV3 608, and EMV4 610. These transaction processing modules include instructions for processing of transactions for EMV implementations, such as modules for Visa, MasterCard, American Express, Diner's, etc. Although four transaction processing modules are depicted in FIG. 6, it will be understood that any suitable number of transaction processing modules may be included within firmware instructions 600 in accordance with the number of payment types that are supported by the payment reader 22.

The transaction processing modules include instructions for processing transactions involving chip cards or other standards-compliant payment devices such as payment applications running on NFC-enabled mobile devices, and may provide instructions for communicating with a payment device, processing transactions, authentication, verification, and other processing of payment transactions. Each transaction processing module may be customized for the particular company or organization associated with the transaction processing module and may also be compliant with payment standards (e.g., standards promulgated and monitored by EMVCo).

The transaction processing modules may be subject to a certification process by an organization such as EMVCo. This certification process may be required for any significant updates to the instructions that perform the payment processing operations on the NFC chip 102 of payment reader 22. Thus, if changes are made to the code that performs the payment processing functionality of a payment reader 22, it may be necessary to perform the certification process again for the new code.

Unlike the operational instructions 602, each transaction processing module 604, 606, 608, and 610 may be compiled and linked independently and as position independent code. Thus, each transaction processing module (e.g., each of transaction processing modules 604, 606, 608, and 610) includes only instructions associated with a single payment processing implementation. The instructions for each of the transaction processing modules are not dependent upon their location within the memory of flash SRAM0 212, nor are there references to code located outside of the respective transaction processing module (e.g., in boot loader 601, operational instructions 602, or any of the other transaction processing modules). For example, EMV1 module 604 may operate properly wherever it is located within the memory of flash SRAM0 212 and may not reference any external instructions (e.g., instructions of operational software 602 or the other transaction processing modules 606, 608, or 610). During the creation of the executable code, the operational software 602 is linked to the transaction processing modules by the linker, but the transaction processing modules do not require linking back to the operational software 602. In this manner, a transaction processing module may be updated without requiring modifications to the other transaction processing modules. Similarly, any change to the operational instructions 602 or any of the other transaction processing modules will not impact the instructions for any particular transaction processing module.

Figure 7:
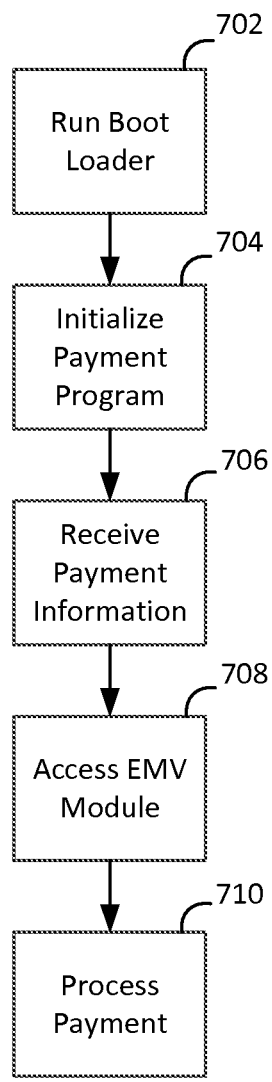
FIG. 7 depicts step for executing firmware stored in memory of an NFC chip in accordance with some embodiments of the present disclosure.
Figure 8:
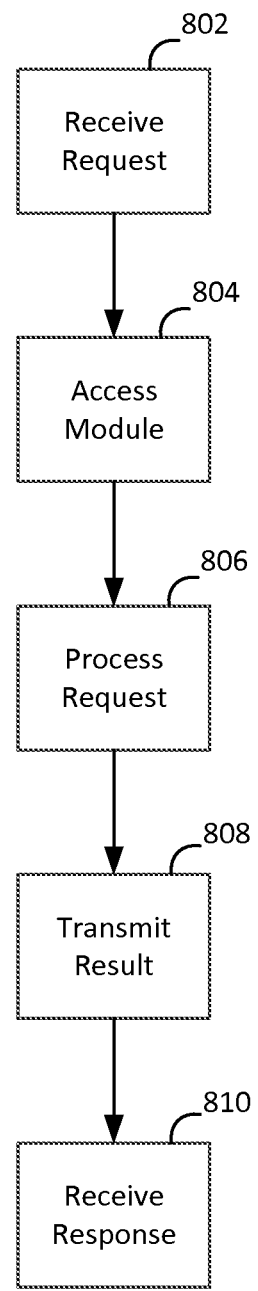
FIG. 8 depicts steps of a method of confirming the certification of a transaction processing module in accordance with some embodiments of the present disclosure.

In view of the structures and devices described supra, methods that can be implemented in accordance with the disclosed subject matter will be better appreciated with reference to the flowcharts of FIGS. 7-8. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 7 depicts step 700 for executing firmware modules of flash SRAM0 212 of NFC chip 102 in accordance with some embodiments of the present disclosure. At step 702, CPU0 206 may access instructions for boot loader 601 from flash SRAM0 212. Executing these instructions may result in the initialization of the NFC chip 202 for operation. Processing may then continue to step 704.

At step 704, CPU0 206 may access instructions for the operational software 602 from flash SRAM0 212. These instructions may include the general instructions for operating payment reader 22. For example, the operational instructions 602 may include instructions for operating a payment application, sending and receiving data over a contactless interface, communicating with the chip card via a contact interface, communicating with internal or external hardware, interacting with a host application running on a merchant device 29, and communicating with CPU1 208 in order to perform cryptographic functions. The instructions of the operational software 602 may be executed, thus permitting the payment reader 22 to process payment transactions. Processing may continue to step 706.

At step 706, the processing of the operational software 602 may result in payment information being received from a payment device 10. For example, a host program running on a merchant device 29 may have indicated to payment reader 22 that a transaction is occurring and a payment is to be received. Instructions of operational software 602 running on CPU0 206 may receive that communication and in response may initialize a payment interface such as contactless circuit 100 or contact interface 166. Once the payment interface interacts with a payment device 10 such as an NFC device 12 or chip card 14 to receive payment information at step 706, processing may continue to step 708.

At step 708, the transaction processing module may be accessed. Based on the received payment information from the payment device, such as an indication of the type of card being used, it may be determined which transaction processing module of the available transaction processing modules (e.g., EMV1 module 604, EMV2 module 606, EMV3 module 608, or EMV4 module 610) should be accessed in order to process the transaction in accordance with the requirements of the issuing company and certification organization. Once the correct transaction processing module is identified, processing may continue to step 710.

At step 710, processing may pass from the operational instructions 602 to the selected transaction processing module 604, 606, 608, or 610. Processing of the payment transaction may then occur in accordance with the instructions of the relevant transaction processing module. For example, the payment information may be encrypted, processed, and transmitted in accordance with a payment procedure of an issuing company that has been certified by EMVCo. In some embodiments, processing may continue to pass back and forth between the selected transaction processing module and the other firmware modules of the operational instructions 602 (e.g., the payment application module 330, host communication module 342, and the cryptographic calculator module 320) to complete the transaction.

FIG. 8 depicts steps 800 of a method of confirming the certification of a transaction processing module in accordance with some embodiments of the present disclosure. As described herein, a certification organization such as EMVCo may confirm compliance with payment standards such as EMV specifications. This includes certification of hardware and software components. With respect to software, it may be necessary to recertify the software if the underlying code including the transaction processing functionality changes.

At step 802, instructions executed from the operational software 602 may determine if there is a request to confirm the certification of one or more of the transaction processing modules stored at NFC chip 102 of payment reader 22. Such a request may be received, for example, via communication with a merchant device 29. In one embodiment, merchant device 29 may be in communication with an external computing device such as a server of an issuing company or certification organization. Once the request to confirm the certification is received, processing may continue to step 804.

At step 804, instructions executing from the operational instructions 602 may access one or more the transaction processing modules that are associated with the received request from step 802. For example, a request from a particular issuer company or certification organization may have requested certification information for a particular one of the transaction processing modules that are stored on flash SRAM0 212 of payment reader 22. Once the transaction processing module or modules have been accessed at step 804, processing may continue to step 806.

At step 806, CPU0 206 may process instructions based on the requirements of the entity that is seeking information regarding the transaction processing module. For example, a particular set of executable instructions may be associated with the requested transaction processing module and may have been certified by the issuer company or certification organization. Those particular executable instructions may have a unique identifier such as a cyclical redundancy code (CRC) that was stored by the issuing company or certification organization at the time of certification. The position independent code of the requested transaction processing module may be accessed and the unique identifier may be accessed or determined (e.g., a CRC may be calculated for the transaction processing module).

At step 808, the result of the processing of step 806 may be provided to the requester. For example, CPU0 206 may execute instructions from the operational software 602 in order to transmit the CRC result to the issuing company or certification organization via merchant device 29. Once the results have been transmitted, processing may continue to step 810.

At step 810, a response may be received at the payment reader 22 indicating whether the transaction processing module passed the certification test. If the transaction processing module passed the certification test, the payment reader 22 may continue to use the transaction processing module to process transactions. If the transaction processing module did not pass the certification test, the payment reader 22 may cease processing transactions using the transaction processing module. In one embodiment, the payment reader may request an update of the transaction processing module that failed the certification test.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A payment reader for processing transactions between a contactless device or a chip card and a point-of-sale application running on a seller mobile device, the payment reader comprising:
   a contactless interface configured to receive payment information from the contactless device;
   a contact interface configured to receive the chip card and receive payment information from the chip card;
   a wireless communication interface configured to communicate with the point-of-sale application;
   a memory comprising firmware instructions, wherein a first subset of the firmware instructions are associated with at least one transaction processing module and a second subset of firmware instructions are associated with one or more other processing functions of the payment reader, and wherein the first subset of firmware instructions comprise position independent code that is located in a distinct section of the memory from the second subset of firmware instructions;

a processor configured to:
  generate a unique identifier for the firmware instructions of the at least one transaction processing module of the plurality of transaction processing modules,
  receive the payment information from the contactless interface or the contact interface in accordance with the second subset of firmware instructions,
  process the payment information in accordance with the first subset of firmware instructions,
  transmit, to one or more other processors, data to be encrypted, such data being based on the first subset of firmware instructions and one or more of: the payment information and the processed payment information,
  receive encrypted data from the one or more other processors, and
  provide the encrypted data to the wireless communication interface in accordance with the second subset of firmware instructions,
wherein the wireless communication interface is configured to transmit the encrypted data to the point-of-sale application.

2. The payment reader of claim 1, wherein the first subset of firmware instructions comprise a plurality of transaction processing modules, wherein a portion of the first subset of firmware instructions are associated with each of the plurality of transaction processing modules, and wherein each of the plurality of transaction processing modules comprise position independent code that is located in a distinct section of memory from the second subset of firmware instructions and the portions of the first subset of firmware instructions associated with each of the other of the transaction processing modules.

3. The payment reader of claim 1, wherein the processor is further configured to receive an update of the first subset of firmware instructions, and wherein the first subset of firmware instructions are replaced by the update without modification of the second subset of firmware instructions.

4. The payment reader of claim 1, wherein the processor is further configured to receive an update of the second subset of firmware instructions, and wherein the second subset of firmware instructions are replaced by the update without modification of the first subset of firmware instructions.

5. A payment reader for processing payment transactions, the payment reader comprising:
  a payment interface configured to receive payment information;
  a memory comprising firmware instructions, wherein a first subset of the firmware instructions are associated with a plurality of transaction processing modules and a second subset of firmware instructions are associated with one or more other processing functions of the payment reader, and wherein portions of the first subset of firmware instructions associated with each of the plurality of transaction processing modules comprise position independent code that is located in a distinct section of memory from the second subset of firmware instructions and the position independent code associated with each of the other of the transaction processing modules; and
  a processor configured to generate a unique identifier for the first subset of firmware instructions, receive the payment information in accordance with the second subset of firmware instructions, and process the payment information in accordance with the first subset of firmware instructions.

6. The payment reader of claim 5, wherein the processor is further configured to receive an update of a first transaction processing module of the plurality of transaction processing modules, and wherein the portion of the first subset of firmware instructions associated with the first transaction processing module is replaced by the update without modification of the second subset of firmware instructions or any of the other of the plurality of transaction processing modules.

7. The payment reader of claim 5, wherein the processor is further configured to receive an update of the second subset of firmware instructions, and wherein the second subset of firmware instructions are replaced by the update without modification of the first subset of firmware instructions.

8. The payment reader of claim 5, further comprising a communication interface, wherein the processor is further configured to receive a request for a unique identifier for a first transaction processing module of the plurality of transaction processing modules via the communication interface and to provide the unique identifier to the communication interface,
  wherein the generation of the unique identifier for the first subset of firmware instructions is performed in response to the request for the unique identifier.

9. The payment reader of claim 8, wherein the processor is further configured to receive a confirmation of the unique identifier via the communication interface and execute the firmware instructions of the first transaction processing module based on the confirmation.

10. The payment reader of claim 8, wherein the unique identifier comprises a cyclical redundancy code (CRC) value for the firmware instructions of the first transaction processing module.

11. The payment reader of claim 5, wherein the payment interface comprises:
  a contactless interface configured to receive payment information from one or more of a contactless device and a chip card; and
  a contact interface configured to receive the chip card and receive payment information from the chip card.

12. The payment reader of claim 5, further comprising a communication interface, wherein the processor is further configured to:
  receive the payment information from the payment interface in accordance with the second subset of firmware instructions,
  transmit, to one or more other processors, data to be encrypted, such data being based on the first subset of firmware instructions and one or more of: the payment information and the processed payment information,
  receive encrypted data from the one or more other processors, and
  provide the encrypted data to the communication interface in accordance with the second subset of firmware instructions,
  wherein the communication interface is configured to transmit the encrypted data to an electronic device.

13. A method for processing payment transactions comprising:
  executing firmware instructions, wherein a first subset of the firmware instructions are associated with a plurality of transaction processing modules, the first subset of the firmware instructions being associated with a unique identifier, and a second subset of firmware instructions are associated with one or more other processing functions of the payment reader, and wherein portions of the first subset of firmware instructions associated with each of the plurality of transaction processing modules comprise position independent code that is located in a distinct section of memory from the second subset of firmware instructions and the position independent code associated with each of the other of the transaction processing modules;

receiving payment information in accordance with the second subset of firmware instructions; and processing the payment information in accordance with the first subset of firmware instructions.

14. The method of claim 13, further comprising:
receiving an update of a first transaction processing module of the plurality of transaction processing modules; and
replacing the portion of the first subset of firmware instructions associated with the first transaction processing module with the update, without modification of the second subset of firmware instructions or any of the other of the plurality of transaction processing modules.

15. The method of claim 13, further comprising:
receiving an update of the second subset of firmware instructions; and
replacing the second subset of firmware instructions without modification of the first subset of firmware instructions.

16. The method of claim 13, further comprising:
receiving a request for a unique identifier for a first transaction processing module of the plurality of transaction processing modules via a communication interface and providing the unique identifier to the communication interface,
wherein the unique identifier associated with the first subset of firmware instructions is generated in response to the request for the unique identifier.

17. The method of claim 16, further comprising:
receiving a confirmation of the unique identifier via the communication interface; and
executing the firmware instructions of the first transaction processing module based on the confirmation.

18. The method of claim 16, wherein the unique identifier comprises a cyclical redundancy code (CRC) value for the firmware instructions of the first transaction processing module.

19. The method of claim 13, further comprising:
receiving the payment information from the payment interface based on the second subset of firmware instructions;
receiving encrypted data based on the first subset of firmware instructions and the payment information; and
transmitting the encrypted data to an electronic device.

20. A non-transitory computer-readable storage medium comprising instructions stored therein, which when executed by one or more processors, cause the one or more processors to perform operations comprising:
executing firmware instructions, wherein a first subset of the firmware instructions are associated with a plurality of transaction processing modules, the first subset of the firmware instructions being associated with a unique identifier, and a second subset of firmware instructions are associated with one or more other processing functions of the payment reader, and wherein portions of the first subset of firmware instructions associated with each of the plurality of transaction processing modules comprise position independent code that is located in a distinct section of memory from the second subset of firmware instructions and the position independent code associated with each of the other of the transaction processing modules;

receiving payment information in accordance with the second subset of firmware instructions; and processing the payment information in accordance with the first subset of firmware instructions.

21. The non-transitory computer-readable storage medium of claim 20, wherein the instructions further comprise instructions that cause the one or more processors to perform operations comprising:
receiving an update of a first transaction processing module of the plurality of transaction processing modules; and
replacing the portion of the first subset of firmware instructions associated with the first transaction processing module with the update, without modification of the second subset of firmware instructions or any of the other of the plurality of transaction processing modules.

22. The non-transitory computer-readable storage medium of claim 20, wherein the instructions further comprise instructions that cause the one or more processors to perform operations comprising:
receiving an update of the second subset of firmware instructions; and
replacing the second subset of firmware instructions without modification of the first subset of firmware instructions.

23. The non-transitory computer-readable storage medium of claim 20, wherein the instructions further comprise instructions that cause the one or more processors to perform operations comprising:
receiving a request for a unique identifier for a first transaction processing module of the plurality of transaction processing modules via a communication interface; and providing the unique identifier to the communication interface,
wherein the unique identifier associated with the first subset of the firmware instructions is generated in response to the request for the unique identifier.

24. The non-transitory computer-readable storage medium of claim 23, wherein the instructions further comprise instructions that cause the one or more processors to perform operations comprising:
receiving a confirmation of the unique identifier via the communication interface; and
executing the firmware instructions of the first transaction processing module based on the confirmation.

25. The non-transitory computer-readable storage medium of claim 23, wherein the unique identifier comprises a cyclical redundancy code (CRC) value for the firmware instructions of the first transaction processing module.

26. The non-transitory computer-readable storage medium of claim 20, wherein the instructions further comprise instructions that cause the one or more processors to perform operations comprising:
receiving the payment information from the payment interface in accordance with the second subset of firmware instructions;
transmitting, to one or more other processors, data to be encrypted, such data being based on the first subset of firmware instructions and one or more of: the payment information and the processed payment information;

receiving encrypted data from the one or more other processors; and transmitting the encrypted data to an electronic device.

27. A payment reader for processing payment transactions, the payment reader comprising:

a payment interface configured to receive payment information;

a memory storing firmware instructions for handling functions performed by the payment reader, wherein the firmware instructions include (a) a first subset of firmware instructions comprising firmware modules associated with transaction processing, wherein the first subset of firmware instructions is associated with a unique identifier and (b) a second subset of firmware instructions comprising firmware modules associated with one or more other processing functions of the payment reader, and wherein each of the firmware modules associated with transaction processing (i) is compiled separately from all other firmware modules and (ii) does not reference code located outside of the respective firmware module; and a processor configured to receive the payment information in accordance with the second subset of firmware instructions and to process the payment information in accordance with the first subset of firmware instructions.

* * * * *